(12) United States Patent
Jeter et al.

(10) Patent No.: US 8,041,929 B2
(45) Date of Patent: Oct. 18, 2011

(54) TECHNIQUES FOR HARDWARE-ASSISTED MULTI-THREADED PROCESSING

(75) Inventors: Robert Jeter, Holly Springs, NC (US);
Trevor Garner, Apex, NC (US);
William Lee, Cary, NC (US); Scott Smith, Mansfield, MA (US); Gegory Goss, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 1386 days.

(21) Appl. No.: 11/454,820

(22) Filed: Jun. 16, 2006

(65) Prior Publication Data
US 2007/0294694 A1 Dec. 20, 2007

(51) Int. Cl.
G06F 9/40 (2006.01)
G06F 9/46 (2006.01)
(52) U.S. Cl. .......................................... 712/228; 718/108
(58) Field of Classification Search .................. 712/228; 718/108
See application file for complete search history.

(56) References Cited

U.S. PATENT DOCUMENTS

| | | |
|---|---|---|
| 4,096,571 A | 6/1978 | Vander Mey |
| 4,400,768 A | 8/1983 | Tomlinson |
| 4,918,600 A | 4/1990 | Harper, III et al. |
| 5,088,032 A | 2/1992 | Bosack |
| 5,247,645 A | 9/1993 | Mirza |
| 5,394,553 A | 2/1995 | Lee |
| 5,428,803 A | 6/1995 | Chen |
| 5,479,624 A | 12/1995 | Lee |
| 5,561,669 A | 10/1996 | Lenney et al. |
| 5,561,784 A | 10/1996 | Chen |
| 5,613,114 A * | 3/1997 | Anderson et al. ............. 718/108 |
| 5,617,421 A | 4/1997 | Chin |
| 5,724,600 A | 3/1998 | Ogi |
| 5,740,171 A | 4/1998 | Mazzola et al. |
| 5,742,604 A | 4/1998 | Edsall et al. |
| 5,764,536 A | 6/1998 | Edsall |

(Continued)

FOREIGN PATENT DOCUMENTS
EP 0744696 11/1996
(Continued)

OTHER PUBLICATIONS
PCT International Preliminary Report on Patentability mailed Sep. 23, 2005 for PCT/US04/05522; 11 pages.
(Continued)

*Primary Examiner* — Daniel Pan
(74) *Attorney, Agent, or Firm* — Patent Capital Group

(57) ABSTRACT

Techniques for processing each of multiple threads that share a core processor include receiving an intra-thread register address from the core processor. This address contains C bits for accessing each of $2^C$ registers for each thread. A thread ID is received from a thread scheduler external to the core processor. The Thread ID contains T bits for indicating a particular thread for up to $2^T$ threads. A particular register is accessed in a register bank that has $2^{(C+T)}$ registers using an inter-thread address that includes both the intra-thread register address and the thread ID. The particular register holds contents for the intra-thread register address for a thread having the thread ID. Consequently, register contents of all registers of all threads reside in the register bank. Thread switching is accomplished rapidly by simply accessing different slices in the register bank, without swapping contents between a set of registers and memory.

29 Claims, 8 Drawing Sheets

U.S. PATENT DOCUMENTS

| | | | |
|---|---|---|---|
| 5,787,255 | A | 7/1998 | Parlan et al. |
| 5,787,485 | A | 7/1998 | Fitzgerald et al. |
| 5,796,732 | A | 8/1998 | Mazzola et al. |
| 5,838,915 | A | 11/1998 | Klausmeier et al. |
| 5,852,607 | A | 12/1998 | Chin |
| 5,909,550 | A | 6/1999 | Shankar et al. |
| 5,982,655 | A | 11/1999 | Doyle |
| 6,026,464 | A | 2/2000 | Cohen |
| 6,119,215 | A | 9/2000 | Key et al. |
| 6,148,325 | A | 11/2000 | Schmidt et al. |
| 6,178,429 | B1 | 1/2001 | Cherf |
| 6,195,107 | B1 | 2/2001 | Iverson |
| 6,222,380 | B1 | 4/2001 | Gerowitz et al. |
| 6,272,520 | B1 * | 8/2001 | Sharangpani et al. ........ 718/108 |
| 6,272,621 | B1 | 8/2001 | Key et al. |
| 6,308,219 | B1 | 10/2001 | Hughes |
| 6,430,242 | B1 | 8/2002 | Buchanan et al. |
| 6,470,376 | B1 * | 10/2002 | Tanaka et al. ................. 718/108 |
| 6,487,202 | B1 | 11/2002 | Klausmeier et al. |
| 6,487,591 | B1 | 11/2002 | Budhraja et al. |
| 6,505,269 | B1 | 1/2003 | Potter |
| 6,529,983 | B1 | 3/2003 | Marshall et al. |
| 6,535,963 | B1 | 3/2003 | Rivers |
| 6,587,955 | B1 | 7/2003 | Foote et al. |
| 6,611,217 | B2 | 8/2003 | Buchanan et al. |
| 6,662,252 | B1 | 12/2003 | Marshall et al. |
| 6,681,341 | B1 | 1/2004 | Fredenburg et al. |
| 6,708,258 | B1 | 3/2004 | Potter et al. |
| 6,770,889 | B2 | 3/2004 | Nun |
| 6,718,448 | B1 | 4/2004 | Ofer |
| 6,728,839 | B1 | 4/2004 | Marshall |
| 6,757,768 | B1 | 6/2004 | Potter et al. |
| 6,795,901 | B1 | 9/2004 | Florek et al. |
| 6,801,997 | B2 | 10/2004 | Joy et al. |
| 6,804,162 | B1 | 10/2004 | Eldridge et al. |
| 6,804,815 | B1 | 10/2004 | Kerr et al. |
| 6,832,279 | B1 | 12/2004 | Potter et al. |
| 6,839,797 | B2 | 1/2005 | Calle et al. |
| 6,845,501 | B2 * | 1/2005 | Thompson et al. ............ 717/140 |
| 6,876,961 | B1 | 4/2005 | Marshall et al. |
| 6,895,481 | B1 | 5/2005 | Mitten et al. |
| 6,918,116 | B2 | 7/2005 | Ang |
| 6,920,562 | B1 | 7/2005 | Kerr et al. |
| 6,947,425 | B1 | 9/2005 | Hooper et al. |
| 6,965,615 | B1 | 11/2005 | Kerr et al. |
| 6,970,435 | B1 | 11/2005 | Buchanan et al. |
| 6,973,521 | B1 | 12/2005 | Indiresan et al. |
| 6,986,022 | B1 | 1/2006 | Marshall et al. |
| 7,047,370 | B1 | 5/2006 | Jeter, Jr. et al. |
| 7,100,021 | B1 | 8/2006 | Marshall et al. |
| 7,124,231 | B1 | 10/2006 | Garner et al. |
| 7,139,899 | B2 | 11/2006 | Kerr et al. |
| 7,155,576 | B1 | 12/2006 | Kerr et al. |
| 7,155,588 | B1 | 12/2006 | Jeter |
| 7,174,394 | B1 | 2/2007 | Garner et al. |
| 7,185,224 | B1 | 2/2007 | Fredenburg et al. |
| 7,194,568 | B2 | 3/2007 | Jeter et al. |
| 7,254,687 | B1 | 8/2007 | Jeter et al. |
| 7,257,681 | B2 | 8/2007 | Jeter et al. |
| 7,290,096 | B2 | 10/2007 | Jeter, Jr. et al. |
| 7,290,105 | B1 | 10/2007 | Jeter et al. |
| 7,302,548 | B1 | 11/2007 | Mitten et al. |
| 7,346,059 | B1 | 3/2008 | Garner et al. |
| 7,411,957 | B2 | 8/2008 | Stacy et al. |
| 7,434,016 | B2 | 10/2008 | Jeter, Jr. |
| 7,447,872 | B2 | 11/2008 | Schroter et al. |
| 7,461,180 | B2 | 12/2008 | Lee et al. |
| 7,464,243 | B2 | 12/2008 | Haridas et al. |
| 7,623,455 | B2 | 11/2009 | Hilla et al. |
| 7,640,355 | B1 | 12/2009 | Marshall et al. |
| 7,848,332 | B2 | 12/2010 | Lee et al. |
| 2001/0001871 | A1 | 5/2001 | Rust |
| 2003/0048209 | A1 | 3/2003 | Buchanan et al. |
| 2003/0058277 | A1 | 3/2003 | Bowman |
| 2003/0159021 | A1 | 8/2003 | Kerr et al. |
| 2003/0225995 | A1 | 12/2003 | Schroter et al. |
| 2004/0139441 | A1 * | 7/2004 | Kaburaki et al. ............. 718/107 |
| 2004/0186945 | A1 | 9/2004 | Jeter et al. |
| 2004/0187112 | A1 * | 9/2004 | Potter, Jr. ...................... 718/100 |
| 2004/0213235 | A1 | 10/2004 | Marshall et al. |
| 2004/0252710 | A1 | 12/2004 | Jeter, Jr. et al. |
| 2005/0010690 | A1 | 1/2005 | Marshall et al. |
| 2005/0100017 | A1 | 5/2005 | Williams et al. |
| 2005/0171937 | A1 | 8/2005 | Hughes et al. |
| 2005/0213570 | A1 | 9/2005 | Stacy et al. |
| 2006/0104268 | A1 | 5/2006 | Lee et al. |
| 2006/0117316 | A1 | 6/2006 | Cismas et al. |
| 2006/0136682 | A1 | 6/2006 | Haridas et al. |
| 2006/0184753 | A1 | 8/2006 | Jeter, Jr. et al. |
| 2006/0221974 | A1 | 10/2006 | Hilla et al. |
| 2007/0067592 | A1 | 3/2007 | Jeter |
| 2007/0095368 | A1 | 5/2007 | Girard et al. |
| 2007/0169001 | A1 | 7/2007 | Raghunath et al. |
| 2007/0220232 | A1 | 9/2007 | Rhoades et al. |
| 2007/0226739 | A1 | 9/2007 | Dodge et al. |
| 2007/0283357 | A1 | 12/2007 | Jeter et al. |
| 2007/0294694 | A1 | 12/2007 | Jeter |
| 2008/0005296 | A1 | 1/2008 | Lee et al. |
| 2008/0013532 | A1 | 1/2008 | Garner et al. |
| 2008/0077926 | A1 | 3/2008 | Jeter et al. |

FOREIGN PATENT DOCUMENTS

| | | | |
|---|---|---|---|
| WO | WO2004/095290 | | 11/2004 |

OTHER PUBLICATIONS

PCT International Search Report mailed Oct. 18, 2004 for PCT/US04/05522; 3 pages.

USPTO Response mailed Mar. 30, 2011 to Dec. 30, 2010 Nonfinal Rejection from U.S. Appl. No. 11/535,956.

USPTO Final Rejection mailed Mar. 16, 2011 from U.S. Appl. No. 11/446,609.

USPTO Dec. 30, 2010 Nonfinal Rejection from U.S. Appl. No. 11/535,956.

USPTO Jun. 3, 2011 Notice of Allowance from U.S. Appl. No. 11/535,956.

USPTO Jun. 23, 2022 Second Notice of Allowance from U.S. Appl. No. 11/535,956.

USPTO Jun. 30, 2011 Request for Continued Examination filed in response to Mar. 16, 2011 Final Rejection from U.S. Appl. No. 11/446,609.

* cited by examiner

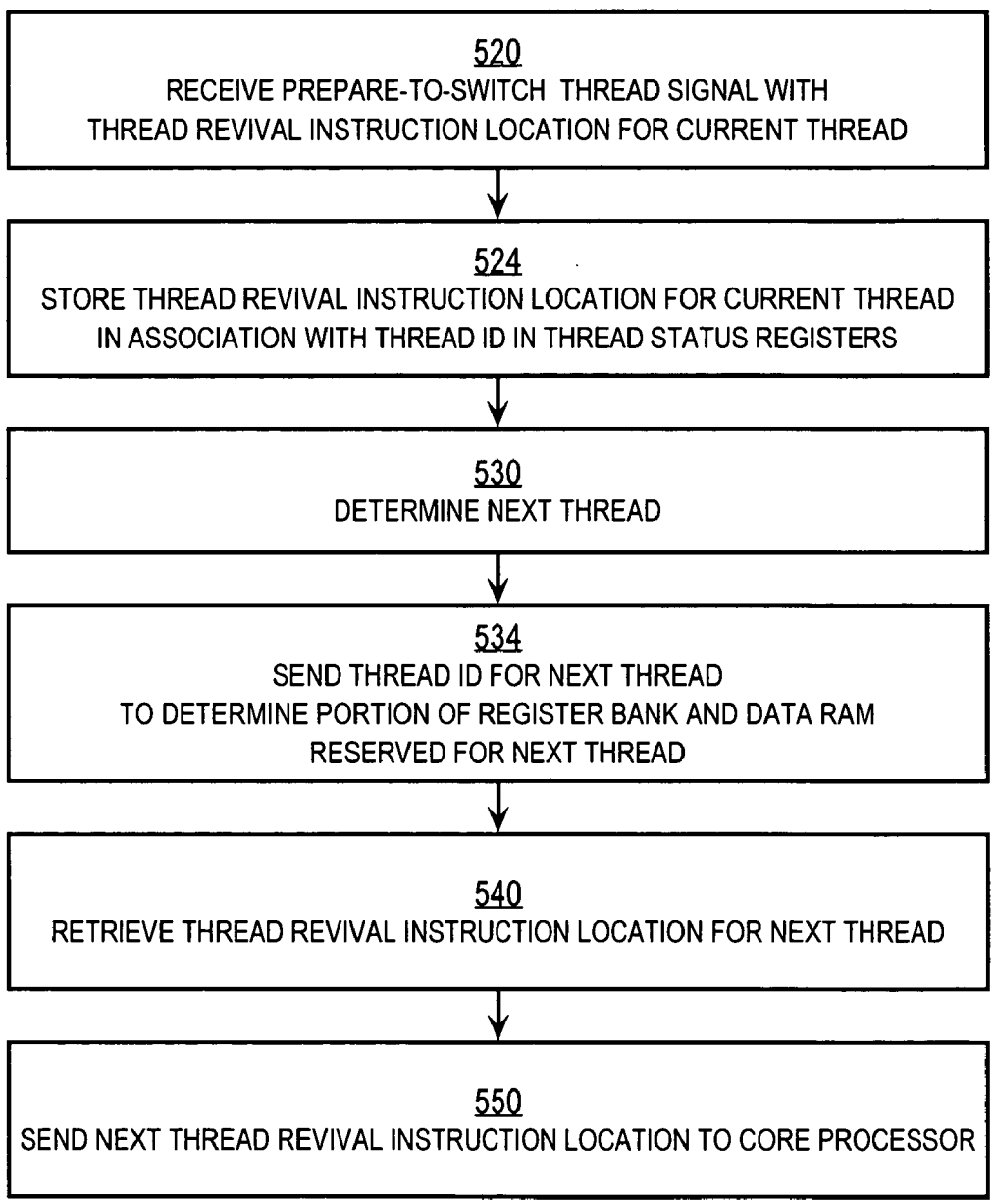

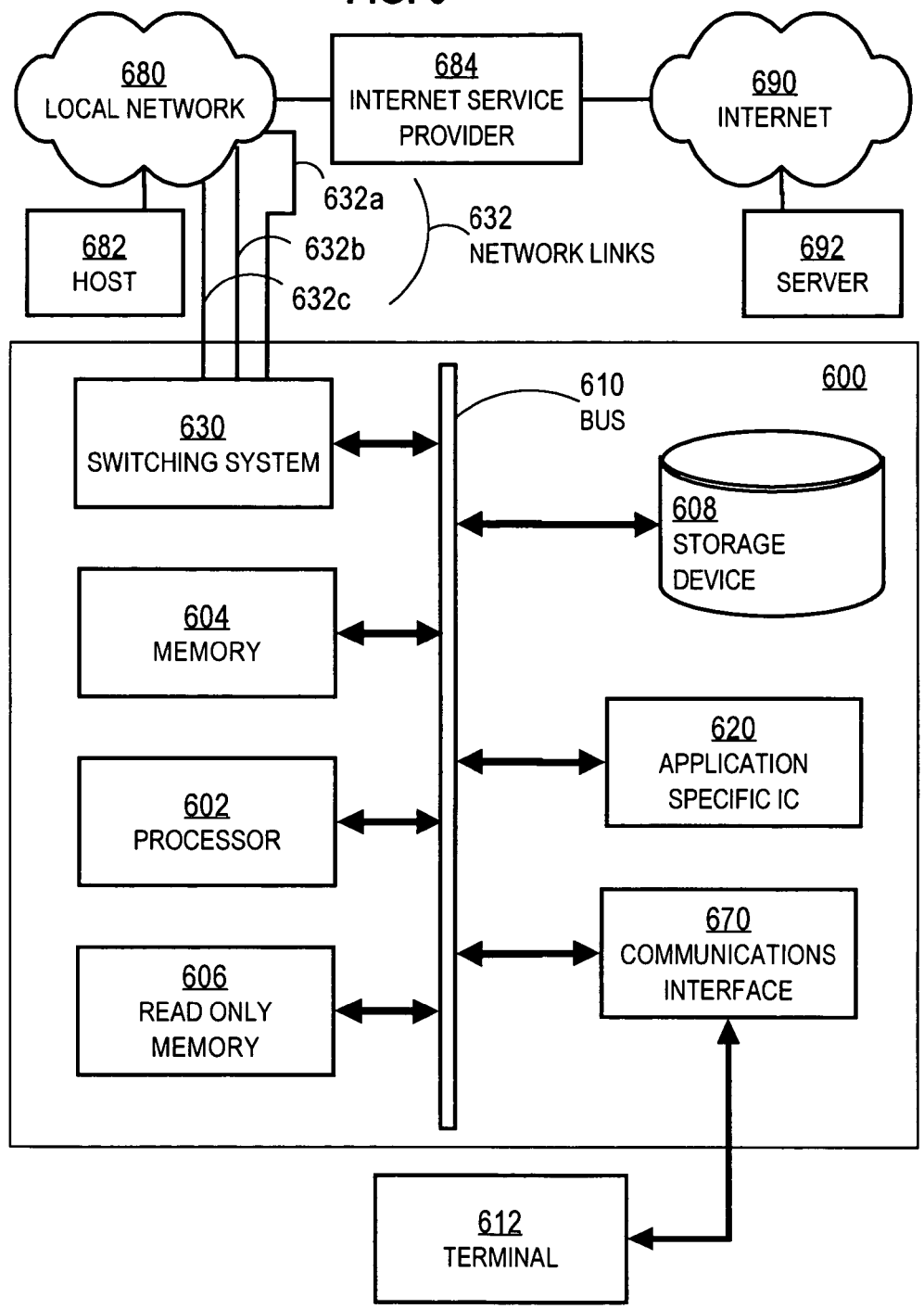

TECHNIQUES FOR HARDWARE-ASSISTED MULTI-THREADED PROCESSING

BACKGROUND OF THE INVENTION

1. Field of the Invention

The present invention relates to using hardware to assist in multi-threaded processing and, in particular, to using hardware to select a sliding window in a register bank and data random access memory (RAM) when switching between threads in fewer clock cycles than in conventional thread switching mechanisms.

2. Description of the Related Art

Many processors are designed to reduce idle time by swapping multiple processing threads. A thread is a set of data contents for processor registers and memory and a sequence of instructions to operate on those contents that can be executed independently of other threads. Some instructions involve sending a request or command to another component of the device or system, such as input/output devices or one or more high valued, high-latency components that take many processor clock cycles to respond. Rather than waiting idly for the other component to respond, the processor stores the contents of the registers and the current command or commands of the current thread to local memory, thus "swapping" the thread out, also described as "switching" threads and causing the thread to "sleep." Then the contents and commands of a different sleeping thread are taken on board, so called "swapped" or "switched" onto the processor, also described as "awakening" the thread. The woken thread is then processed until another wait condition occurs. A thread-scheduler is responsible for swapping threads on or off the processor, or both, from and to local memory. Threads are widely known and used commercially, for example in operating systems for most computers.

Some thread wait conditions result from use of a high-value, long-latency shared resource, such as expensive static random access memory (SRAM), quad data rate (QDR) SRAM, content access memory (CAM) and ternary CAM (TCAM), all components well known in the art of digital processing. For example, in a router used as an intermediate network node to facilitate the passage of data packets among end nodes, a TCAM and QDR SRAM are shared by multiple processors to parse data packets and classify them as a certain type using a certain protocol or belonging to a particular stream of data packets with the same source and destination. Processing for each packet typically involves from five to seven long-latency memory operations invoking the TCAM or QDR or both. These long-latency memory operations can take about 125 clock cycles or more of a 500 MegaHertz clock (MHz, 1 MHz=$10^6$ cycles per second) that paces processor operations. The parse and classify software programs typically execute twenty to fifty instructions between issuing a request for a long-latency memory operation. A typical instruction is executed in one or two clock cycles.

A desirable goal of a router is to achieve line rate processing. In line rate processing, the router processes and forwards data packets at the same rate that those data packets arrive on the router's communications links. Assuming a minimum-sized packet, a Gigabit Ethernet link line rate yields about 1.49 million data packets per second, and a 10 Gigabit Ethernet link line rate yields about 14.9 million data packets per second. A router typically includes multiple links. To achieve line rate processing, routers are configured with multiple processors. The idle time introduced by the frequent long-latency memory accesses increases the number of processors needed to support line rate processing.

In one approach, commercially available multi-threaded processors are used. While suitable for many purposes, the commercially available multi-threaded processors suffer some disadvantages. One disadvantage is that thread switching involves many clock cycles as all the contents of multiple registers used by the processor as operands and results of instructions are swapped, i.e., moved off the processor to a more spacious memory (that is often off the chip and requires use of a shared bus) and replaced by contents of registers for a different thread in another portion of that memory. These multi-threaded processors also consume clock cycles to swap instructions and data in local caches to other more spacious memory, such as off-chip memory. These extra cycles reduce the effectiveness of each multi-threaded processor and requires the deployment of more such processors to achieve line rate processing in a router Another disadvantage is that some multi-threaded processors use a thread scheduler process that forces a thread switch at arbitrary times, such as after a certain number of clock cycles unrelated to when the thread issues a long-latency memory operation. Such processors incur the cost of thread switching without the benefit of reduced idle time on the processor.

In another approach, a processor could be designed to switch threads when long-latency commands are issued using larger on-chip memories to reduce clock cycles in swapping information with more distant larger capacity memories when threads are switched, and also provide an option to avoid swapping instruction sets. However, the design and development of a new processor is an extremely costly effort that takes many years. Such effort is typically justified only for a mass market. Thus, there is little likelihood that such an effort can or will be undertaken soon.

Based on the foregoing, there is a clear need for techniques for thread-switching that do not suffer some or all the deficiencies of the conventional approaches in multi-threaded processors.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a flow diagram that illustrates a method at an external thread scheduler, according to an embodiment; and FIG. 6 is a block diagram that illustrates a computer system configured as a router for which an embodiment of the invention may be implemented.

DETAILED DESCRIPTION

Techniques are described for switching among processing threads using a hardware assist. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in detail below in the context of a data packet switching system on a router that has four processors, each allowing up to four threads that share use of a TCAM and QDR for updating routing tables while forwarding data packets at a high speed line rate. However, the invention is not limited to this context. In various other embodiments, more or fewer processors allowing more or fewer threads share more or fewer components of the same or different types in the same or different devices.

1.0 Network Overview

Figure 1:
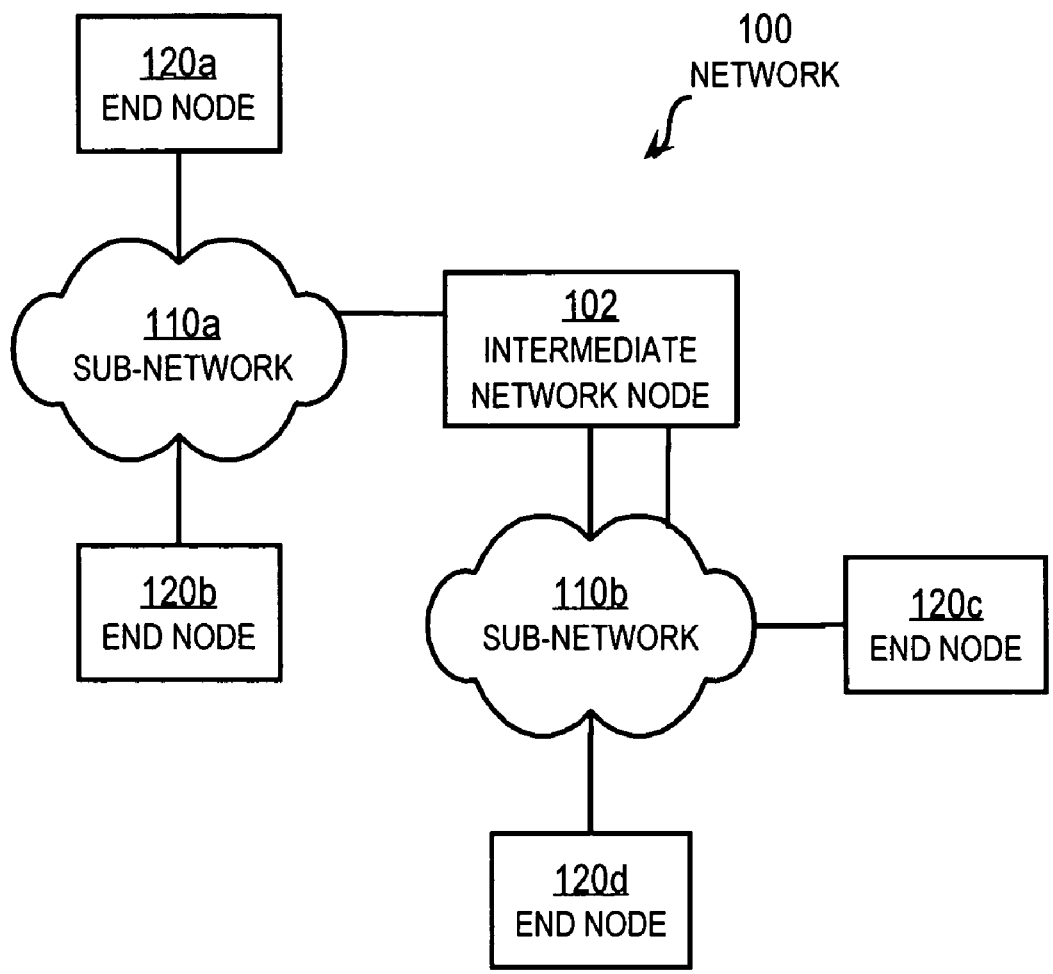
FIG. 1 is a block diagram that illustrates a network 100, according to an embodiment.

FIG. 1 is a block diagram that illustrates a network 100, according to an embodiment. A computer network is a geographically distributed collection of interconnected sub-networks (e.g., sub-networks 110a, 110b, collectively referenced hereinafter as sub-network 110) for transporting data between nodes, such as computers, personal data assistants (PDAs) and special purpose devices. A local area network (LAN) is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, e.g., intermediate network node 102, such as a router or switch, that facilitates routing data between end nodes 120. As used herein, an end node 120 is a node that is configured to originate or terminate communications over the network. In contrast, an intermediate network node 102 facilitates the passage of data between end nodes. Each sub-network 110 includes zero or more intermediate network nodes. Although, for purposes of illustration, intermediate network node 102 is connected by one communication link to sub-network 110a and thereby to end nodes 120a, 120b and by two communication links to sub-network 110b and end nodes 120c, 120d, in other embodiments an intermediate network node 102 may be connected to more or fewer sub-networks 110 and directly or indirectly to more or fewer end nodes 120 and directly to more other intermediate network nodes.

Information is exchanged between network nodes according to one or more of many well known, new or still developing protocols. In this context, a protocol consists of a set of rules defining how the nodes interact with each other based on information sent over the communication links. Communications between nodes are typically effected by exchanging discrete packets of data. Each data packet typically comprises 1] header information associated with a particular protocol, and 2] payload information that follows the header information and contains information to be processed independently of that particular protocol. In some protocols, the packet includes 3] trailer information following the payload and indicating the end of the payload information. The header includes information such as the source of the data packet, its destination, the length of the payload, and other properties used by the protocol. Often, the data in the payload for the particular protocol includes a header and payload for a different protocol associated with a different function at the network node.

The intermediate node (e.g., node 102) typically receives data packets and forwards the packets in accordance with predetermined routing information that is distributed among intermediate nodes in control plane data packets using a routing protocol. The intermediate network node 102 is configured to store data packets between reception and transmission, to determine a link over which to transmit a received data packet, and to transmit the data packet over that link.

According to some embodiments of the invention described below, the intermediate network node 102 includes four processors that allow up to four threads, and includes a TCAM and QDR memory to share among those threads. The TCAM is used to store route information so that it can be retrieved quickly based on a destination address, e.g., an Internet Protocol (IP) address or a Media Access Control (MAC) address.

According to embodiments of the invention, a data processing system, such as the intermediate network node 102, includes a modified mechanism for switching threads on each of one or more processors. Such a mechanism makes line rate performance at the router more likely. In these embodiments, all contents and data for all threads for one processor are stored in a larger register bank, and data RAM, respectively, so that swapping of contents does not occur during a thread switch. Instead a different portion (also called a "slice" or "window") of the register bank and data RAM is reserved for each thread and accessed based on a thread ID for the current thread. The current thread ID is supplied by a thread scheduler block separate from the core processor. The modified mechanism allows a conventional single or multi-threaded processor to be used to switch threads in fewer cycles than conventional approaches.

2.0 Structural Overview

Conventional elements of a router which may serve as the intermediate network node 102 in some embodiments are described in greater detail in a later section with reference to FIG. 6. At this juncture, it is sufficient to note that the router 600 includes one or more general purpose processors 602 (i.e., central processing units, CPUs), a main memory 604 and a switching system 630 connected to multiple network links 632, and a data bus 610 connecting the various components. According to some embodiments of the invention, a general purpose processor 602 is modified as described in this section. In some embodiments, one or more processors (not shown) on switching system 630 are so modified.

Figure 2A:
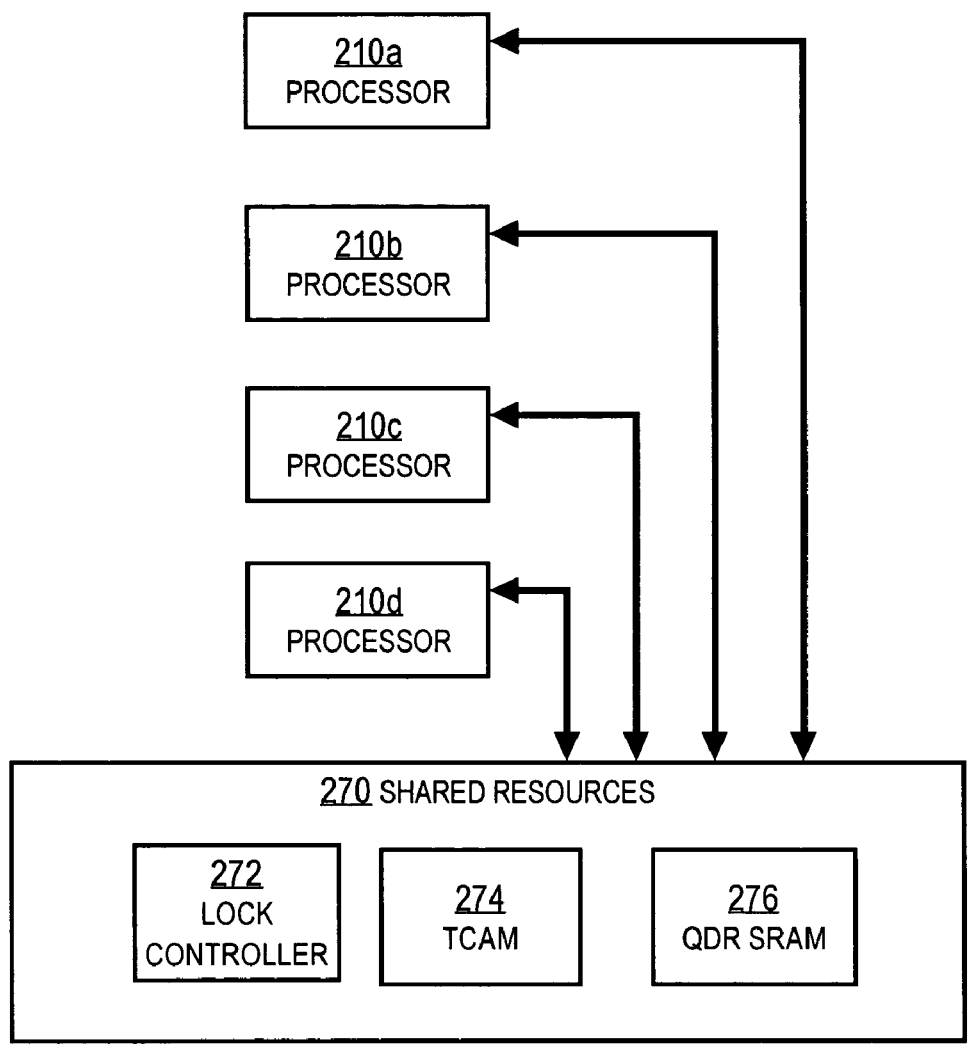
FIG. 2A is a block diagram that illustrates a multi-processor system in a router.

FIG. 2A is a block diagram that illustrates a multi-processor system in a router 200. The router 200 includes four processors 210a, 210b, 210c, 210d (collectively referenced hereinafter as processors 210). The router 200 also includes a shared resources block 270. Data is passed between the processors 210 and the shared resources block 270.

The shared resources block 270 includes one or more shared resources and a lock controller 272 for issuing locks as requested for any of those shared resources. In the illustrated embodiment, the shared resources include a TCAM 274 and a QDR SRAM 276.

Figure 2B:
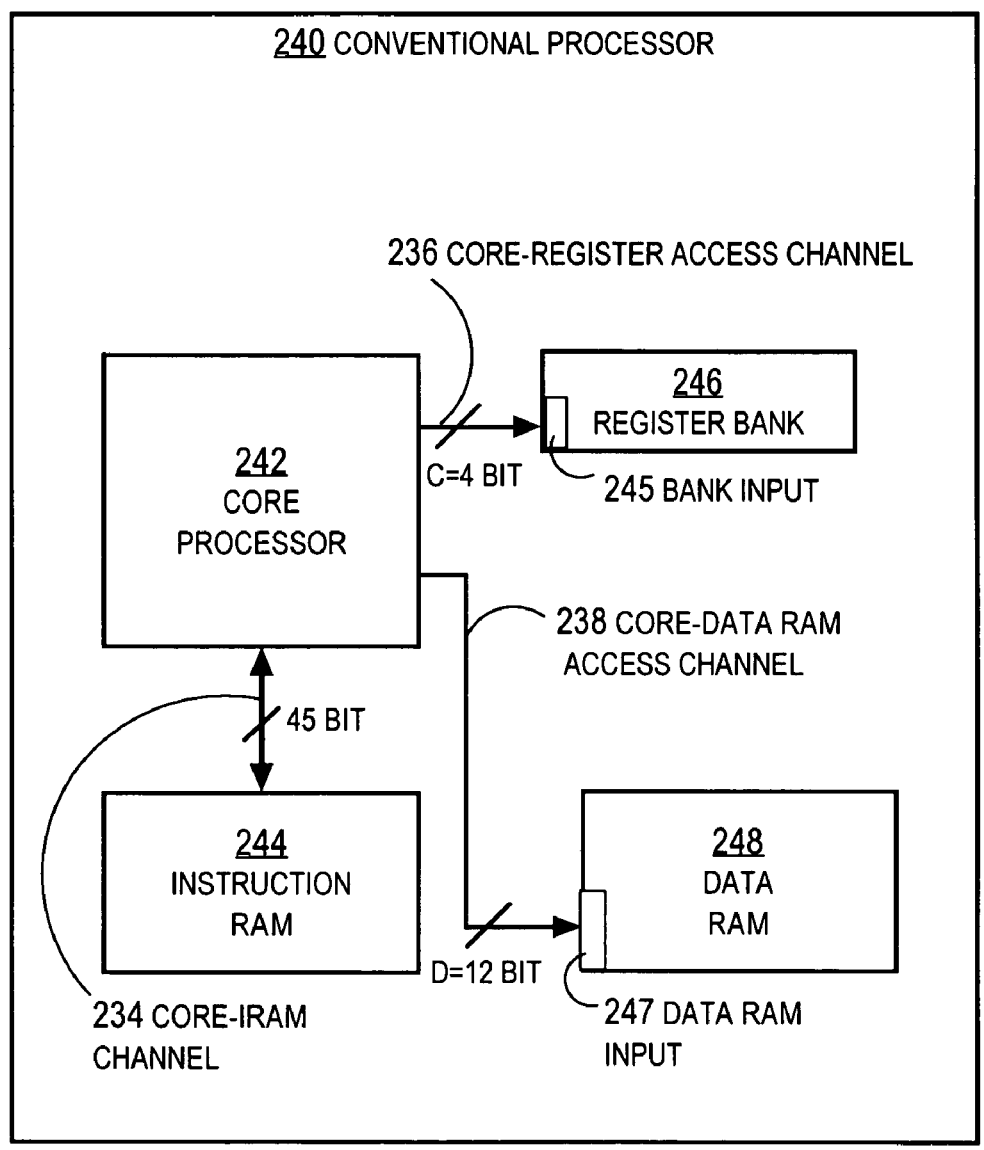
FIG. 2B is a block diagram that illustrates a conventional processor.

FIG. 2B is a block diagram that illustrates a conventional processor 240 that is used as processor 210 in some embodiments. The conventional processor 240 includes a core processor 242, an instruction random access memory (IRAM) 244, a register bank 246 and a data RAM 248. These components are connected by data channels that are sets of parallel wires that each carries a voltage indicating a value of a single bit of information. The number of parallel wires in the channel is the bit width of the channel and is proportional to the number of bits that can be transferred during one clock cycle. The data channels include core-IRAM channel 234, core-register access channel 236 and core-data RAM access channel 238.

The core processor 242 is a circuitry block that implements logic to execute coded instructions. Input and output to the core processor are effected through leads that are exposed on the outside of the core processor. A data channel connects certain leads on the core processor 242 to leads that serve as input and output on other blocks of circuitry. The IRAM 244 is a circuitry block that supports random access memory read and write operations. In some embodiments, IRAM 244 is read only memory and supports only read operations for retrieving IRAM contents. The register bank 246 is a circuitry block that supports random access memory read and write operations for a small set of memory locations that are easily addressed by a few bits in the instructions retrieved from IRAM. The register bank 246 has $2^c$ addressable locations. In the illustrated embodiment C=4 so that register bank 246 has $2^4$=16 addressable locations. The data RAM 248 is a circuitry block that supports random access memory read and write operations for a larger set of memory locations. The data RAM 248 serves as a fast local storage for data used by the current thread. An instruction typically involves moving the contents of one location to or from a register in register bank 246. The data RAM 248 has $2^D$ addressable locations. In the illustrated embodiment D=12 so that register bank 246 has $2^{12}$=4096 addressable locations. In some other available processors 240 one or more of C and D are equal to different values. At each addressable location in register 246 and data RAM 248, 64 bits of content are stored.

The core processor 242 uses some leads connected to core-IRAM channel 234 to retrieve a next instruction from IRAM 244. In the illustrated embodiment, the core-IRAM channel 234 has a width of 45 bits, i.e., includes 45 parallel wires that connect leads on the core processor 242 to leads on the IRAM 244. On the 45 bit core-IRAM channel 234, 13 bits are used to express a location in the IRAM from which an instruction is to be retrieved, and 32 bits are used to indicate the instruction retrieved. The instruction typically includes data that indicates an address for one or more registers in register bank 246 or an address for a location in data RAM 248. The address of a register is expressed by a value made up of C bits, while an address for a location in the data RAM is expressed by a value made up of D bits. In the illustrated embodiment, C=4 and D=12; in some other processors one or more of C and D are equal to different numbers of bits. After the instruction is retrieved, it is executed and the result is indicated on leads of the core processor specified by the instruction.

Some leads on core processor 242 are connected to a core-register channel to get or put contents for a particular register in register bank 246. The core-register channel includes a C bit core-register access channel 236 to indicate a particular register and a wider channel (not shown) to hold the contents. The core-register access channel 236 is connected to a bank input 245 comprising C leads. In the illustrated embodiment, C=4 bits, and the wider channel (not shown) is 64 bits wide.

Similarly, some leads are connected to a core-data RAM channel to get or put contents for a particular location in data RAM 248. In an illustrated embodiment, the core-data RAM channel includes a D=12 bit core-data RAM access channel 238 to indicate a particular location and a 64 bit channel (not shown) to hold the contents. The core-data RAM access channel 238 is connected to a data RAM input 247 comprising D leads.

Some instructions involve using still other leads (not shown) to send a request to off-processor elements, such as shared resources 270, using other data channels (not shown).

In some conventional approaches to using processor 240 for multiple threads, a thread scheduler application executes on core processor 242 and determines when to switch threads. When a thread is to be switched, the thread scheduler application swaps register bank 246 and, sometimes, data RAM 248 used by the current thread with the contents for those elements of a different thread, which contents are stored on some more distant memory. This approach for switching threads consumes many clock cycles in the process. Also the thread scheduling application itself consumes some of the space on IRAM 244, register bank 246 and data RAM 248, leaving less of that space for the threads themselves.

3.0 Thread Switching Apparatus

According to various embodiments of the invention, the core processor 242 continues to access registers, data RAM locations and IRAM locations as if these components were of a size only for a single thread, using the same leads and data channels as in the conventional approaches. However, in these embodiments of the invention, one or more larger components are used to store contents for all threads that may share the core processor. Contents for different threads are stored in different portions of the larger components (also called slices or windows of the larger components). The different portions are indicated by additional bits in the address inputs, and those bits are provided by an external thread scheduler as a unique thread ID for the current thread to be executed by the core processor. A unique thread ID of T bits is associated with each thread of the up to $2^T$ threads allowed to share core processor 242. Thus, during thread switching, only the value of the bits supplied by the external thread scheduler change, and contents of the register bank, data RAM and IRAM need not be swapped. This approach reduces the work load during thread switching and significantly reduces the number of clock cycles consumed to complete the switch.

For purposes of illustration, a blocked thread scheme is used to determine when to switch threads, but in other embodiments, other thread switching schemes are used. In a blocked thread system, a thread executes on a processor until the thread determines that it should relinquish the processor to another thread and issues a switch thread command. The thread scheduler determines which of the sleeping threads, if any, to awaken and execute on the processor after the switch. It is further assumed, for purposes of illustration that a thread relinquishes control of the processor after issuing a request for a long-latency memory operation.

Figure 3A:
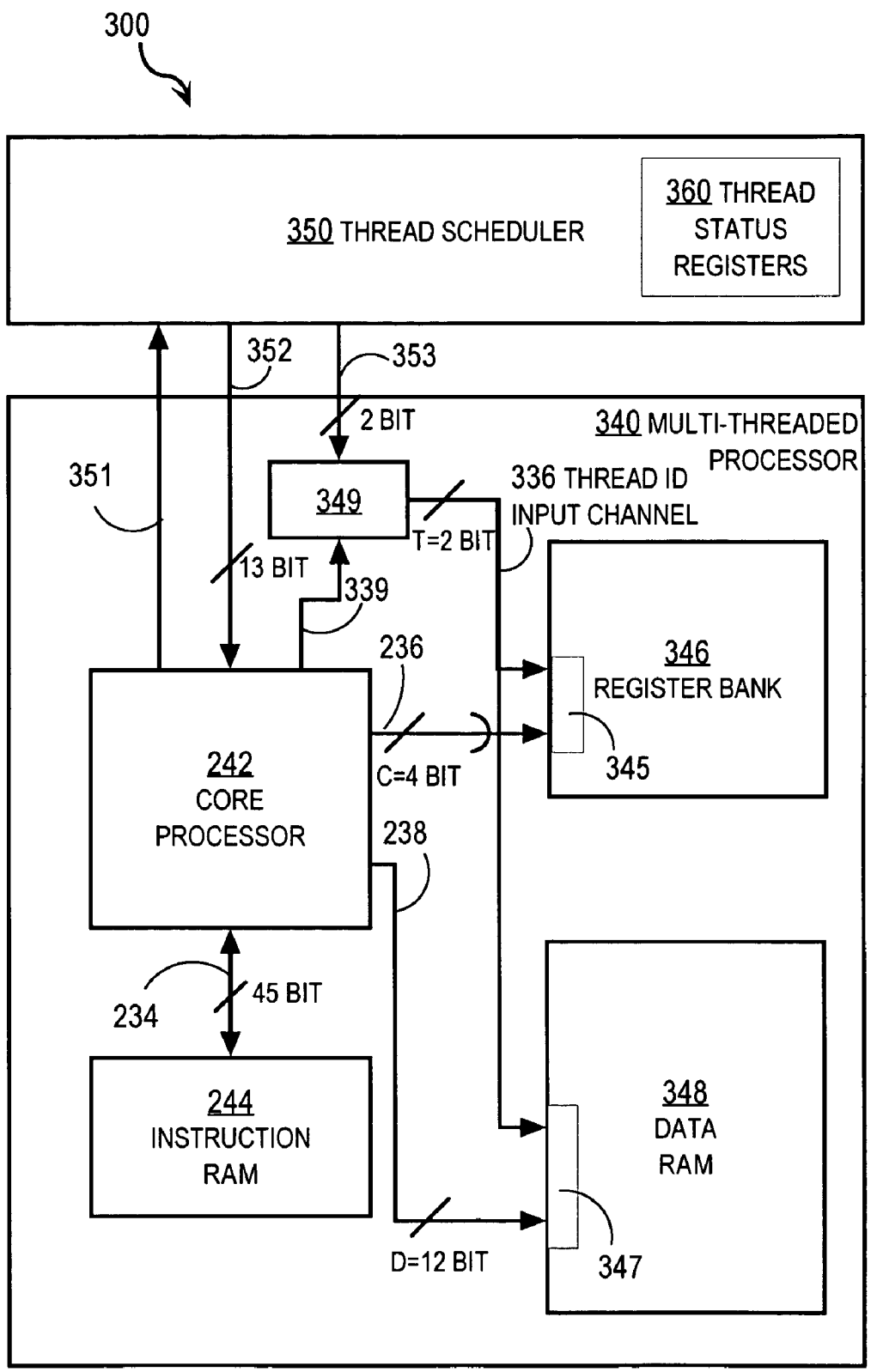
FIG. 3A is a block diagram that illustrates an apparatus with external thread scheduler and a multi-threaded processor based on the same core processor as the conventional processor, according to an embodiment

FIG. 3A is a block diagram that illustrates an apparatus 300 with an external thread scheduler 350 and a multi-threaded processor 340 based on the same core processor as the conventional processor, according to an embodiment. The apparatus is configured to switch among up to $2^T$ processing threads. In an illustrated embodiment, T=2 so that up to four threads are allowed to share the core processor. In various other embodiments, the value of T is greater than or less than 2.

The core processor 242, IRAM 244, core-IRAM channel 234, core-register access channel 236, core-data RAM access channel 238, and 64-bit channels (not shown) connected to core processor 242 are as described above with reference to FIG. 2B.

The register bank 346 is $2^T$ times the size of the register bank 246, so that the registers for all $2^T$ threads can be stored in register bank 346. A particular register in register bank 346 is accessed by a particular value placed on the leads in bank input 345. Bank input 345 includes T leads more than the number of leads in bank input 245. Similarly, the data RAM 348 is $2^T$ times the size of the data RAM 248, so that the data for all $2^T$ threads can be stored in data RAM 348. A particular location in data RAM 348 is accessed by a particular value placed on the leads in data RAM input 347. Data RAM input 347 includes T leads more than the number of leads in data RAM input 247. Thus in the illustrated embodiment bank input 345 involves 6 leads and data RAM input 347 involves 14 leads.

In the illustrated embodiment, the IRAM 244 is the same as in conventional processor 240, because all $2^T$ threads execute the same instructions. In some embodiments in which different threads execute different sequences of instructions, IRAM 244 is replaced by a larger IRAM sufficient to hold the instructions for all $2^T$ threads. A location in the larger IRAM is indicated by more than the conventional 13 bits. In some embodiments, the larger IRAM may be less than $2^T$ times the size of IRAM 244. For example, in some embodiments, some threads execute one sequence of instructions and all other threads execute a different second set of instructions, so that only two sets of instructions are involved and an IRAM twice the size of IRAM 244 is sufficient.

The apparatus 300 includes thread scheduler 350, flip-flop register 349, and data channels 351, 352, 353, 336 and 339 connecting them to each other and to the other components. The external thread scheduler 350 is a circuitry block with logic to receive information from the core processor 242 about a current thread when the thread is to be switched, and determine which of the other threads, if any, is eligible to be awakened and next take possession of the core processor 242. Any method may be implemented in thread scheduler 350 to determine whether a thread is eligible. For example, in some embodiments a thread is eligible if the thread scheduler has received a response for every request for shared resource operations, such as a long-latency memory operation. If no thread is eligible, then a default idle thread is selected by the thread scheduler 350. If several threads are eligible, the external thread scheduler 350 arbitrates to select one of the eligible threads. Any method may be used to select the eligible thread. For example, in some embodiments, the oldest eligible thread is selected as the next thread. In some embodiments, a highest priority eligible thread is selected, and the oldest of the highest priority eligible threads is selected if more than one has the same highest priority.

The thread scheduler 350 includes thread status registers 360 where information is stored about each of up to $2^T$ threads. The information in the thread status registers 360 is used by the external thread scheduler 350 to determine the eligibility, priority, and activity of the threads that share core processor 242. The thread status registers 360 are described in more detail below with reference to FIG. 3B.

A switch preparation channel 351 is wide enough to transfer, from leads on the core processor 242 to leads on the external thread scheduler 350, the location in the IRAM for the next instruction of the current thread to be executed when the current thread is revived at some later time. In an illustrated embodiment, the switch preparation channel is 15 bits (13 bits for IRAM address, 1 bit to indicate whether the thread is done or retired, and 1 bit to indicate priority when thread received). In other embodiments more or fewer bits are included. A thread instruction channel 352 is wide enough to transfer, from leads on the thread scheduler 350 to leads on the core processor 242, a location in the IRAM for the next instruction of the reviving next thread. In the illustrated embodiment, the thread instruction channel 352 is 13 bits wide. A thread ID load channel is T bits wide to provide the thread ID for the next thread used as the additional T bits in the bank input 345 and data RAM input 347.

In the illustrated embodiment, the thread ID load channel 353 connects leads on the thread scheduler 350 to leads on the flip-flop register 349. When the thread switch signal is received at the flip-flop register 349, the thread ID is registered and stored by the flip-flop register on the leads connected to a thread ID input channel 336. The thread ID input channel 336 connects the flip-flop register 349 to T leads of the bank input 345 and T leads of the data RAM input 347. The thread switch signal is received at the flip-flop register 349 from the core processor 242 on a thread switch output channel 339. In the illustrated embodiment, the switch output channel 339 is 1 bit wide.

The value on the T additional leads in register bank input 345 and data RAM input 347 are provided on thread ID input channel 336. In an example embodiment, the thread ID input channel is connected to the T leads of the inputs 345 and 347 that correspond to the most significant bits. However, the invention is not limited to this choice. In other embodiments any T leads of inputs 345 and 347 are connected to the thread ID input channel 336, as long as none of those T leads are the same as the C leads connected to core-register access channel 236 or the D leads connected to core-data RAM access channel 238.

In embodiments in which different threads use different instructions, then the thread ID input channel 336 also connects to one or more bits for an input for an enlarged IRAM (not shown).

Figure 3B:
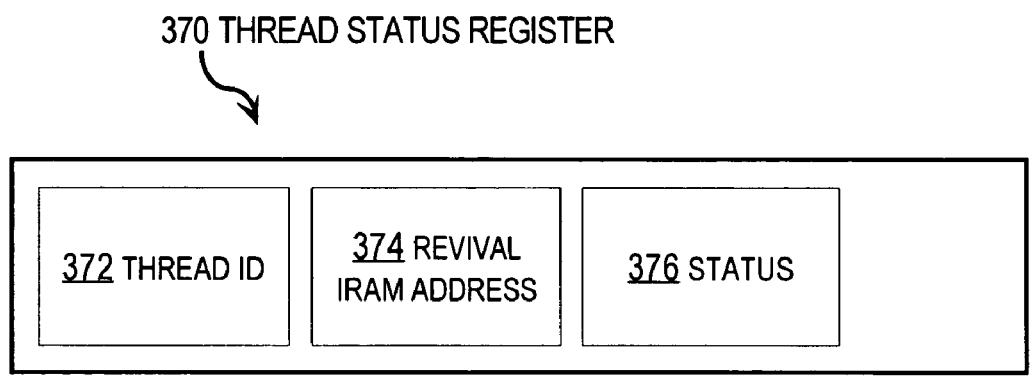
FIG. 3B is a block diagram that illustrates a thread status register for the external thread scheduler, according to an embodiment.

FIG. 3B is a block diagram that illustrates a thread status register 370 for the thread status registers 360 in the external thread scheduler 350, according to an embodiment. In the illustrated embodiment, the register 370 includes for one thread a thread ID field 372, a revival IRAM address field 374 and a status field 376.

The thread ID field holds T bits that uniquely identify each thread that shares use of core processor 242. In the illustrated embodiment, the thread ID field 372 is 2 bits in size. The revival IRAM address field 374 holds data that indicates a location in IRAM 244 where the instruction resides that is to be executed next when the thread identified in the thread ID field 372 is switched back onto the core processor 242. In the illustrated embodiment, the revival IRAM address field 374 is 13 bits in size. The status field 376 holds data that indicates a status of the thread identified in the thread ID field 372. In the illustrated embodiment, the status field is 4 bits. Three bits are used to indicate thread state: (1) Idle, (2) Waiting for responses, (3) Ready, (4) Running, (5) Retired or complete. One bit is used to indicate priority.

Although fields 372, 374, 376 are shown as contiguous portions of an integral register 370 in the illustrated embodiment for purposes of illustration, in various other embodiments one or more fields or other portions of register 370 are stored as more or fewer fields in the same or more registers on or near the thread scheduler 350. In some embodiments, additional fields are included in the thread status register 370, or associated with the thread having the thread ID in field 372. For example, in some embodiments a priority field indicates a priority for the thread and an age rank field indicates how many threads preceded the thread in being switched off the core processor 242. In some embodiments another field with more than T bits is used as a thread descriptor in addition to the thread ID in thread ID field 372.

4.0 Method at Core Processor

The apparatus described above supports very fast switching among multiple threads on core processor 242, whether the core processor is a single threaded processor or a multi-threaded processor using conventional thread switching. In the latter case, the internal thread switching and thread scheduler is bypassed and, instead, the external thread scheduler 350 and switching is performed. In this section is described a method used on the core processor 242 to interact with the components of the apparatus 300.

Figure 4:
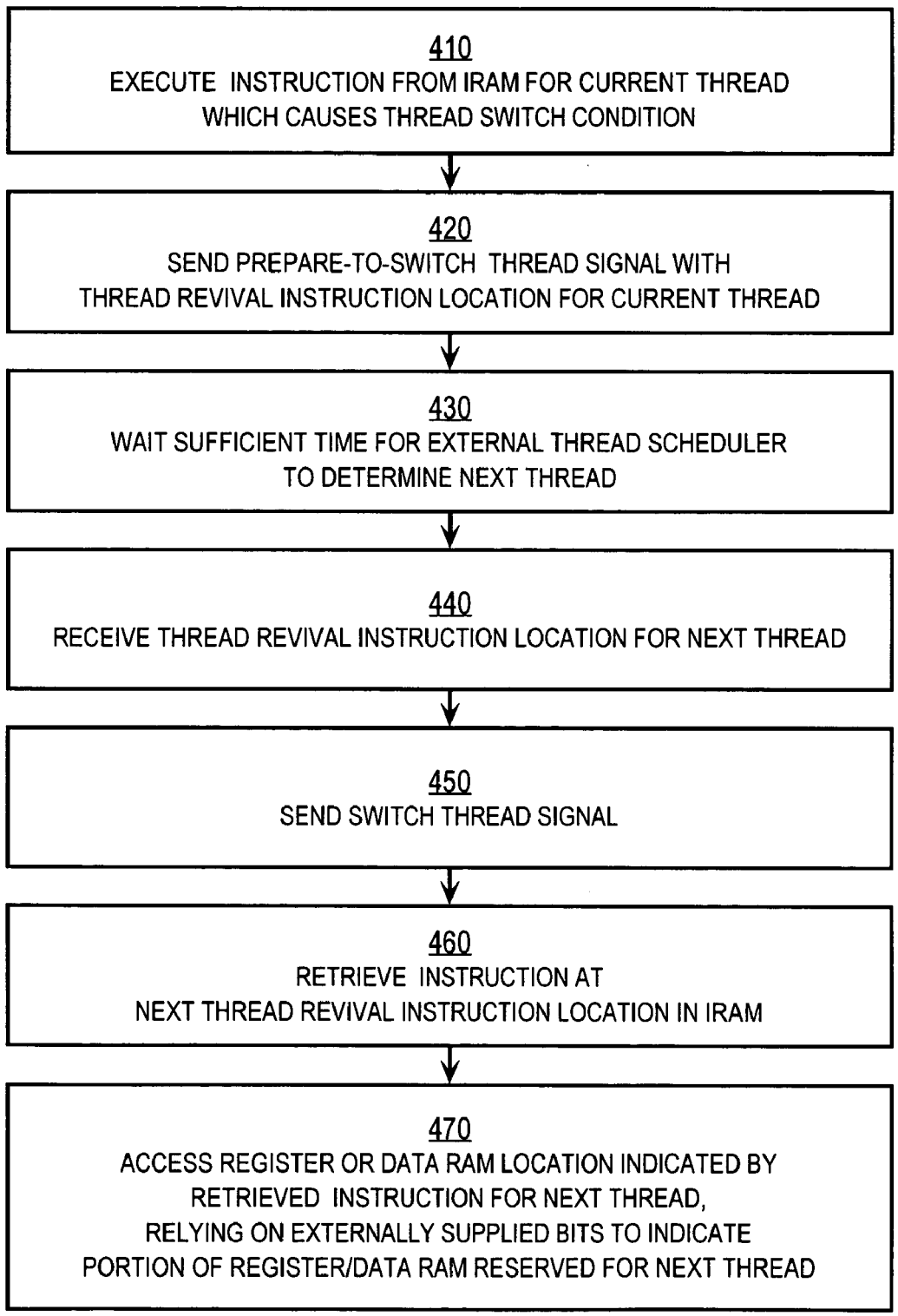
FIG. 4 is a flow diagram that illustrates a method programmed on the core processor, according to an embodiment using a thread scheduler.

FIG. 4 is a flow diagram that illustrates a method 400 programmed on the core processor, according to an embodiment using an external thread scheduler. Although steps are shown in FIG. 4 and subsequent flow diagrams in a particular order for purposes of illustration, in other embodiments one or more steps are performed in a different order or overlapping in time, or one or more steps are omitted, or the method is changed in some combination of ways.

In step 410, the core processor executes an instruction retrieved from the IRAM, which causes a thread switch condition. For example, the instruction requests one or more operations on a long-latency shared memory component. The programmer who wrote these instructions knows that after one or more such operations, the thread should switch off the core processor and so recognizes that the instruction causes a thread switch condition. In some embodiments, an interpreter or compiler recognizes the switch condition automatically.

In step 420, a prepare-to-switch signal is sent. The prepare-to-switch signal includes data that indicates the next instruction to execute when the thread is switched back onto the core processor and resumes processing. In addition, the prepare-to-switch signal includes data that indicates whether or not the current thread is completed processing (retired), or, if not retired, the priority of the thread when it is revived. For example, the following C language statements are used to generate the core processor instructions.

```
path_m:
    ...
    prepare_to_switch (path_n);
    ...
    next_thread = switch_thread();
    jump next_thread;
path_n:
    ...
```

At the end of the C statements indicated by the first ellipsis, a long-latency memory operation is issued. The statements through jump next_thread are executed before the current thread is switched off the processor. When the current thread is switched back on, the next instruction is generated by the C statement at the label path_13 n. Therefore, the prepare_to_switch statement includes as an argument the path_n label. The compiler or interpreter, as is well known in the art, translates the C language label path_n to a processing instruction address in the IRAM.

In step 430, the processor waits sufficient time for the external thread scheduler 350 to determine the next thread. It is assumed for purposes of illustration that 6 cycles of a 500 MHz clock is sufficient for the external thread scheduler 350 to determine the next thread and to send the thread ID for the next thread to flip-flop register 349 over thread ID load channel 353. In the illustrated embodiment, the second ellipsis in the C language statements above stands for one or more statements that enforce this wait. Any instructions that have the desired effect may be used.

In step 440, a thread revival instruction location for the next thread is received. During the waiting time interval of step 430, the external thread scheduler 350 sends a location in IRAM for an instruction for the next thread to the core processor through thread instruction channel 352. In the illustrated embodiment, thread revival instruction location for the next thread is received, from the external thread scheduler 350, at leads on the core processor 242 connected to thread instruction channel 352.

In step 450 a send switch thread signal is sent. For example, a 1 bit signal is sent from core processor 242 through switch output channel 339 to the flip-flop register 249. As a result, the T bits that identify the next thread are placed on the thread ID input channel 336 by the flip-flop register 349. As a consequence, the portion of the register bank 346 and data RAM 348 associated with the next thread will be accessed as a result of subsequent addresses placed on core-register access channel 236 and core-data RAM access channel 238, respectively, by core processor 242.

In the illustrated embodiment, steps 440 and 450 are performed by the C language statement next_thread=switch_thread ( ). The routine call switch_thread ( ) causes the switch signal to be sent for step 450, and the routine switch_thread ( ) returns a value of the IRAM location received over channel 352. That IRAM location is stored in the C language variable next_thread.

In step 460, the instruction at the IRAM location for the next thread is retrieved and executed. For example, the C language statement jump next_thread retrieves and executes the instruction at the IRAM location stored in the C language variable next_thread.

In step 470 a register or data RAM location indicated in a retrieved instruction is accessed by the core processor using the C bits on channel 236 or D bits on channel 238, respectively, and relying on the T bits from channel 336 to indicate the appropriate portion of the register bank and data RAM, respectively. For example, if the retrieved instruction indicates that register 1001 (binary) is to be accessed and the thread scheduler has determined that the next thread has thread ID 10 (binary), then the contents of register 101001 (binary) are accessed. If the thread had thread ID 01 (binary) instead of 10 (binary), then the contents of register 011001 (binary) are accessed. Thus register contents for the next thread are accessed without moving contents into or out of $2^C$ register locations (e.g., 16 register locations). Similarly, data RAM contents for the next thread are accessed without moving contents into or out of $2^D$ data RAM locations (e.g., 4096 data RAM locations). Many clock cycles are save compared to conventional thread switching approaches.

5.0 Method at Thread Scheduler

In this section is described a method used on external thread scheduler 350 to interact with the components of the apparatus 300. FIG. 5 is a flow diagram that illustrates a method at an external thread scheduler 350, according to an embodiment.

In step 520 a prepare-to-switch signal is received from the core processor 242. The prepare-to-switch signal includes data that indicates an IRAM location where resides an instruction to execute when the current thread is revived to switch back onto core processor 242. For example, a signal is received on thread preparation channel 351 that includes a IRAM location associated with the C language path_n label. It is assumed for purposes of illustration that the path_n label is associated with the 13 bit IRAM location 1000110001100 (binary). As described above, the prepare-to-switch signal includes data that indicates whether the thread is done, retired, or complete as well as priority when revived.

In step 524, the IRAM location for the thread revival instruction is stored in the thread status registers 360 in associations with a thread ID for the current thread. For example, if the thread ID of the current thread is 10 (binary), then the IRAM location is stored in the revival IRAM address field 374 in the thread status register 370 where the thread ID field 372 includes the value 10 (binary). It is further assumed for purposes of illustration that a value is also stored in the status field 376 for the same register, which indicates that the thread is active but ineligible.

In step 530, the external thread scheduler 350 determines the next thread in response to receiving the prepare-to-switch signal. As described above, any method may be used. In the illustrated embodiment, the next thread is the oldest eligible thread. It is assumed for purposes of illustration that the thread with thread ID 01 (binary) is the oldest eligible thread.

In step 534, the thread ID for the next thread is sent to determine the portion of the register bank and data RAM reserved for the next thread. For example, the two bit thread ID 01 is sent to the flip-flop register 349 over thread ID load channel 353. When a switch thread signal is later received at flip-flop register 349, the two bits 01 will be provided over thread ID input channel 336 to the register bank input 345 and data RAM input 347.

In step 540, the IRAM location for the thread revival instruction for the next thread is retrieved. It is assumed for purposes of illustration that the contents of revival IRAM address field 374 is 0100110001111 (binary) for the register in which the contents of the thread ID field is 01. Thus, during step 540 the value 0100110001111 is retrieved from the thread status registers 360.

In step 550, the IRAM location for the thread revival instruction for the next thread is sent to the core processor 242. For example the value 0100110001111 is sent over thread instruction channel 352 and thus provided to the leads on core processor 242 connected to channel 352. The core processor 242 uses this value to retrieve the next instruction from IRAM 244 after the switch thread signal is issued to the flip-flop register 349, as described above in method 400. If it is further assumed that the IRAM location 0100110001111 corresponds to C language statement path_m, then the core processor 242 begins executing thread 01 at C language statement path_m.

Using the apparatus 300 and method 400 at core processor 242 and method 500 at external thread scheduler 350, threads are switched at core processor 242 much faster, on the order of 6 clock cycles, than is possible using other approaches that require saving register values or other architecture state before switching threads. Furthermore, the 6 cycles between the "prepare to switch" and "switch" signals can filled with other useful instructions so that there is effectively no switch overhead. The thread switch time can be as small as the number of cycles for a taken branch.

6.0 Router Hardware Overview

FIG. 6 is a block diagram that illustrates a computer system 600 serving as a router for which an embodiment of the invention may be implemented by replacing one or more of conventional components described here with one or more components described above.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for processing a thread of a plurality of threads that share a core processor, comprising:
    an instruction random access memory (IRAM) for storing one or more sequences of instructions;
    a bank of registers for storing data that is used as operands and results of the one or more series of instructions for a plurality of threads, said bank of registers including a bank address input for accessing a register in the bank of registers;
    a thread ID input channel that has a width of T bits for receiving data that indicates a current thread identifier (ID) of a plurality of up to $2^T$ threads, said thread ID input channel connected to T bits of the bank address input;
    a core processor for executing the one or more sequences of instructions for a current thread of the plurality of threads by accessing contents of a register for up to $2^C$ registers for the current thread in the bank of registers;
    a core register access channel with a width of C bits, which connects the core processor to C bits of the bank address input different from the T bits to which the thread ID input channel is connected, wherein the bank of registers includes a plurality of registers, the bank address input includes a number C+T bits, and an intra-thread register indicated by the core processor has an intra-thread address that has C bits, whereby, for a particular intra-thread register indicated on the core register access channel, a particular register accessed by the bank address input holds data that indicates contents for the particular intra-thread register for a thread having the current thread ID;
    a data random access memory (data RAM) for storing additional data for the plurality of threads, said data RAM including a data RAM address input for accessing contents of a location in the data RAM; and
    a core data RAM channel with a width of D bits, which connects the core processor to D bits of the data RAM address input.

2. An apparatus as recited in claim 1, further comprising a switch output channel from the core processor, wherein the one or more sequences of instructions include instructions that, when executed by the core processor cause the core processor to send a thread switch signal on the switch output channel during a cycle when a current thread relinquishes control of the core processor.

3. An apparatus as recited in claim 2, further comprising a flip-flop register connected to the switch output channel and the thread ID input channel, wherein the apparatus is configured such that:
    the flip flop register holds data that indicates a thread ID of a next thread to execute on the core processor; and
    when the thread switch signal is received at the flip-flop register, the data that indicates the thread ID of the next thread is placed on the thread ID input channel.

4. An apparatus as recited in claim 3, further comprising a thread scheduler block different from the core processor, wherein the thread scheduler block is configured to perform the step of sending, to the flip-flop register, the data that indicates the thread ID of the next thread.

5. An apparatus as recited in claim 4, wherein the thread scheduler block is further configured to perform the steps of:
    receiving thread instruction location data from the core processor when a thread is ready to relinquish control of the core processor, which thread instruction location data indicates a location in the IRAM where the thread is to resume when switched back onto the core processor; and
    sending thread instruction location data to the core processor for the next thread.

6. An apparatus as recited in claim 4, wherein the thread scheduler block is further configured to perform the step of determining which thread, if any, of a plurality of threads switched off the core processor is the next thread.

7. An apparatus as recited in claim 4, wherein.
    the apparatus further comprises a switch preparation channel connecting the core processor to the thread scheduler;
    execution of the one or more sequences of instructions by the core processor further causes the core processor to perform the step of sending a prepare-to-switch signal on the switch preparation channel before said step of sending a thread switch signal; and
    the thread scheduler block is further configured to perform the steps of receiving the prepare-to-switch signal on the switch preparation channel, and
    performing said step of sending, to the flip-flop register, the data that indicates the thread ID of the next thread in response to receiving the prepare-to-switch signal.

8. An apparatus as recited in claim 7, wherein the thread scheduler block is further configured to perform the step of determining which thread, if any, of a plurality of threads that were previously switched off the core processor is the next thread, in response to receiving the prepare-to-switch signal.

9. An apparatus as recited in claim 7, wherein
    the apparatus further comprises a thread instruction channel connecting the core processor to the thread scheduler;
    the prepare-to-switch signal includes data that indicates, for the current thread, thread instruction location data that indicates a location in the IRAM where a thread is to resume when switched back onto the core processor; and
    the thread scheduler block is further configured to perform the step of sending thread instruction location data for the next thread to the core processor over the thread instruction channel in response to receiving the prepare-to-switch signal.

10. An apparatus as recited in claim 1, further comprising a network interface for communicating there through a data packet.

11. A method for processing a thread of a plurality of threads that share a core processor, comprising:
receiving, from a core processor, an intra-thread register address that contains a core number C of bits for accessing each register of $2^C$ registers available to each thread of a plurality of threads;
receiving, from a thread scheduler component external to the core processor, a thread identifier (ID) that contains a thread ID number T of bits for indicating a particular thread in a plurality of up to $2^T$ threads;
accessing, in a computer-readable medium configured as a register bank that has registers, a particular register that has an inter-thread address that includes both the intra-thread register address and the thread ID, wherein the particular register holds data that indicates contents for the intra-thread register address for a thread having the thread ID, whereby register contents of all registers of all threads reside in the register bank;
sending a thread switch signal during a cycle when a current thread relinquishes control of the core processor;
receiving a new thread ID for a next thread of the plurality of threads in response to sending the thread switch signal; and
sending a prepare-to-switch signal before the sending of a thread switch signal.

12. A method as recited in claim 11, wherein the thread ID received from the thread scheduler component indicates a current thread executing on the core processor.

13. A method as recited in claim 11, further comprising the steps of:
receiving, from a core processor, a intra-thread data random access memory (data RAM) address that contains a core data number D of bits of accessing each data RAM address of $2^D$ data RAM addresses available to each thread of the plurality of threads;
receiving, from the thread scheduler component, the thread ID; and
accessing, in a computer-readable medium configured as a data RAM that has $2^{(D+T)}$ locations, a particular data RAM location that has an inter-thread data RAM address that includes both the intra-thread data RAM address and the thread ID,
wherein the particular data RAM location holds data that indicates contents for the intra-thread data RAM address for a thread having the thread ID,
whereby data RAM contents of all intra-thread data RAM addresses of all threads reside in the data RAM.

14. A method as recited in claim 11, further comprising:
receiving thread instruction location data when a thread is ready to relinquish control of the core processor, which thread instruction location data indicates a location in a computer-readable medium configured as an instruction random access memory (IRAM) where the thread is to resume when switched back onto the core processor; and
sending thread instruction location data to the core processor for the next thread.

15. A method as recited in claim 11, further comprising determining which thread, if any, of a plurality of threads switched off the core processor is the next thread.

16. A method as recited in claim 11, further comprising determining which thread, if any, of a plurality of threads that were previously switched off the core processor is the next thread, in response to receiving the prepare-to-switch signal.

17. A method as recited in claim 11, wherein:
the prepare-to-switch signal includes data that indicates, for the current thread, thread instruction location data that indicates a location in the IRAM where a thread is to resume when switched back onto the core processor; and
the method further comprises sending thread instruction location data for the next thread to the core processor in response to receiving the prepare-to-switch signal.

18. An apparatus for processing a thread of a plurality of threads that share a core processor, comprising:
means for receiving, from a core processor, an intra-thread register address that contains a core number C of bits for accessing each register of $2^c$ registers available to each thread of a plurality of threads;
means for receiving, from a thread scheduler component external to the core processor, a thread identifier (ID) that contains a thread ID number T of bits for indicating a particular thread in a plurality of up to $2^T$ threads;
means for accessing, in a computer-readable medium configured as a register bank that has registers, a particular register that has an inter-thread address that includes both the intra-thread register address and the thread ID, wherein the particular register holds data that indicates contents for the intra-thread register address for a thread having the thread ID, whereby register contents of all registers of all threads reside in the register bank;
means for sending a thread switch signal during a cycle when a current thread relinquishes control of the core processor;
means for receiving a new thread ID for a next thread of the plurality of threads in response to sending the thread switch signal; and
means for sending a prepare-to-switch signal before the sending of a thread switch signal.

19. A method at a core processor for switching between threads of a plurality of processing threads that share the core processor, comprising the steps of:
sending a prepare-to-switch signal to a first block external to the core processor while executing instructions of a current processing thread, wherein the prepare-to-switch signal includes data that that indicates a current thread revival instruction location in a computer-readable medium configured as an instruction random access memory (IRAM);, where is located an instruction to be executed by the core processor when the current processing thread resumes processing on the core processor;
in response to sending the prepare-to-switch signal, receiving from the first block a next thread instruction location in the IRAM, where is located an instruction to be executed by the core processor when the next processing thread resumes processing on the core processor; and
after sending the prepare-to-switch signal, performing the steps of
sending a thread switch signal to a second block external to the core processor; and
retrieving a next instruction from the next thread instruction location in the IRAM.

20. A method as recited in claim 19, further comprising the step of accessing a register in a computer-readable medium configured as a bank of registers for up to $2^c$ registers for each thread of a plurality of $2^T$ threads that share the core processor by sending C bits from the next instruction to a bank input for the bank of registers, wherein:

the bank of registers includes $2^{(C+T)}$ addressable registers each accessed based on C+T bits received at the bank input; and in response to said step of sending the switch thread signal, T bits that indicate a thread identifier (ID) for the next processing thread are provided to bits in the bank input different from the C bits sent by the core processor.

21. A method as recited in claim 20, wherein the thread ID for the next processing thread is determined by the first block in response to receiving the prepare-to-switch signal.

22. A method as recited in claim 21, wherein:

the second block is different from the first block; and the thread ID for the next processing block is sent from the first block to the second block in response to receiving the prepare-to-switch signal.

23. A method as recited in claim 19, further comprising the step of accessing a data location in a computer-readable medium configured as a data random access memory (data RAM) for up to $2^D$ registers for each thread of the plurality of $2^T$ threads that share the core processor by sending D bits from the next instruction to a data RAM input for the data RAM, wherein:

the data RAM includes $2^{(D+T)}$ addressable locations each accessed based on D+T bits received at the data RAM input; and in response to said step of sending the switch thread signal, T bits that indicate the thread ID for the next processing thread are provided to bits in the data RAM input different from the D bits sent by the core processor.

24. A method as recited in claim 19, further comprising the step of issuing a request for a long-latency memory operation, wherein said step of sending the prepare-to-switch signal to the first block is performed after said step of issuing the request for a long-latency memory operation.

25. A method at a thread scheduler external to a core processor for switching between threads of a plurality of processing threads that share the core processor, comprising the steps of:

receiving a prepare-to-switch signal from a core processor while the core processor executes instructions of a current processing thread, wherein the prepare-to-switch signal includes data that that indicates a current thread revival instruction location in a computer-readable medium configured as an instruction random access memory (IRAM);, where is located an instruction to be executed by the core processor when the current processing thread resumes processing on the core processor;

storing the current thread revival instruction location in association with a thread ID for the current processing thread in a data structure for a plurality of up to $2^T$ processing threads that share the core processor; and in response to receiving the prepare-to-switch signal, performing the steps of determining a next processing thread of the plurality of up to $2^T$ processing threads to be executed on the core processor, retrieving from the data structure a next thread instruction location in the IRAM, where is located an instruction to be executed by the core processor when the next processing thread resumes processing on the core processor, and sending the next thread instruction location to the core processor.

26. A method as recited in claim 25, further comprising, in response to receiving the prepare-to-switch signal, performing the step of providing the thread ID for the next processing thread for use by a computer-readable medium configured as a bank of registers for up to $2^c$ registers for each thread, wherein the bank of registers includes $2^{(C+T)}$ addressable registers each accessed by C+T bits received at a bank input.

27. A method as recited in claim 26, wherein:

the method further comprises causing the thread ID to be sent to T bits in the bank input in response to a thread switch signal sent from the core processor; and C bits in the bank input different from the T bits caused to be sent by the thread scheduler are sent by the core processor.

28. A method as recited in claim 25, further comprising, in response to receiving the prepare-to-switch signal, performing the step of providing the thread ID for the next processing thread for use by a computer-readable medium configured as a data random access memory (data RAM) for up to $2^D$ registers for each thread, wherein the data RAM includes $2^{(D+T)}$ addressable registers each accessed by D+T bits received at a data RAM input.

29. A computer-readable medium storing one or more sequences of instructions for switching between threads of a plurality of processing threads that share a core processor, wherein execution of the one or more sequences of instructions by the core processor causes the core processor to perform the steps of:

sending a prepare-to-switch signal to a first block external to the core processor while executing instructions of a current processing thread, wherein the prepare-to-switch signal includes data that that indicates a current thread revival instruction location in a computer-readable medium configured as an instruction random access memory (IRAM);, where is located an instruction to be executed by the core processor when the current processing thread resumes processing on the core processor;

in response to sending the prepare-to-switch signal, receiving from the first block a next thread instruction location in the IRAM, where is located an instruction to be executed by the core processor when the next processing thread resumes processing on the core processor; and after sending the prepare-to-switch signal, performing the steps of sending a thread switch signal to a second block external to the core processor; and retrieving a next instruction from the next thread instruction location in the IRAM.

* * * * *